United States Patent
Drescher et al.

(10) Patent No.: US 12,461,914 B1
(45) Date of Patent: Nov. 4, 2025

(54) ADAPTIVE EARLY FILTERING WITH INTRA-PIPELINE PREDICATE BACK-PROPAGATION

(71) Applicant: SAP SE, Walldorf (DE)

(72) Inventors: Florian Drescher, Munich (DE); Till Merker, Sandhausen (DE); Paul Willems, Heidelberg (DE); Alexander Ostertag, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/755,454

(22) Filed: Jun. 26, 2024

(51) Int. Cl.
*G06F 16/2453* (2019.01)

(52) U.S. Cl.
CPC .. G06F 16/24542 (2019.01); G06F 16/24537 (2019.01)

(58) Field of Classification Search
CPC ......... G06F 16/24542; G06F 16/24537; G06F 16/24544; G06F 16/2456; G06F 16/2453; G06F 16/2455; G06F 16/90335; Y10S 707/99933; Y10S 707/99934
See application file for complete search history.

(56) References Cited

U.S. PATENT DOCUMENTS

| | | | | |
|---|---|---|---|---|
| 7,539,660 B2* | 5/2009 | Focazio | ................ | G06F 16/284 |
| 12,072,887 B1* | 8/2024 | Schieferstein | .... | G06F 16/24553 |
| 2020/0117664 A1* | 4/2020 | Kondiles | ................... | G06F 7/24 |
| 2021/0397552 A1* | 12/2021 | Winn | .................... | G06F 12/023 |
| 2024/0370440 A1* | 11/2024 | Veselova | ........... | G06F 16/24556 |
| 2025/0086177 A1* | 3/2025 | Armbrust | .......... | G06F 16/24568 |

* cited by examiner

*Primary Examiner* — Cheyne D Ly
(74) *Attorney, Agent, or Firm* — SCHWEGMAN LUNDBERG & WOESSNER, P.A.

(57) ABSTRACT

In an example embodiment, an early filter is applied with a query plan using intra-pipeline predicate back-propagation. Specifically, the query plan may be thought of as a pipeline of operations. A runtime variable var may be introduced, and a specialized filter using var may be pushed down below the join operation. Var is a dynamic variable that is updated to track a value from the sort or similar operation (such as max (heap), reflecting the maximum value of a max-heap used by the sort or similar operation). The runtime variable gets initialized once the heap reaches a minimum number of elements (such as K in the case of a top K sort). Thus, before the heap reaches that minimum number of elements, the filter does not apply. Once the heap does reach that minimum number of elements, the filter does apply and acts to filter elements. Since the filter has been pushed down below the join operation, this saves processing cycles.

20 Claims, 9 Drawing Sheets

ADAPTIVE EARLY FILTERING WITH INTRA-PIPELINE PREDICATE BACK-PROPAGATION

BACKGROUND

A database may be configured to store a plurality of electronic data records. These data records may be organized, in accordance with a database schema, into various database objects including, for example, one or more database tables. The database is coupled with a database management system (DBMS), which may be configured to support a variety of database operations for accessing the data records stored in the database. These database operations may include, for example, structured query language (SQL) queries and/or the like.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Various operations may be performed on data stored in databases. Specifically, it is common to perform operations that include commands to perform some action on data while limiting the output results in some way. One example is a limit and/or offset clause along with the sort command that limits the output to a set number of "top" results (such as a sort with a "top K" or "limit K" clause, where K is the set number of results). Another example is an aggregation that comprises some sort of limit or limits, such as an aggregation with a "min" or "max" clause (or both).

When database commands are received by a database, typically they will be converted into a query plan, which specifies the exact operations to be performed within the database to satisfy the database commands. This query plan may be optimized to reduce the number of processing cycles necessary to fulfill the database commands. For example, if a database command that comprises a top K sort, such as "order data set D in ascending order, limit K" is received, this command may be converted into a series of operations. One operation may establish a max-heap, which is a tree structure where each node has a value that is greater than its child node, and thus the top (root) node is the maximum value of all nodes in the max-heap A second operation may be to determine whether the size of the max-heap is at the limit K. If not, then a third operation may be to add an element from data set D to the max-heap and reorder the max-heap. If not, then a fourth operation may be to determine whether an element from data set D is greater than the value in that top (root) node, and if so, to discard the element since it cannot possibly fulfill the database command. This is in contrast to an inefficient mechanism to handle this element, which would be to add it to the to the max-heap and then reorder and prune the max-heap, which adds unnecessary processing cycles. Thus, the query plan allows for efficient pruning by essentially pre-pruning the max-heap prior to an element being added to the max-heap, if possible, and therefore potentially eliminating that element from being added to the max-heap at all. In this way, the query plan has been optimized.

Figure 1:
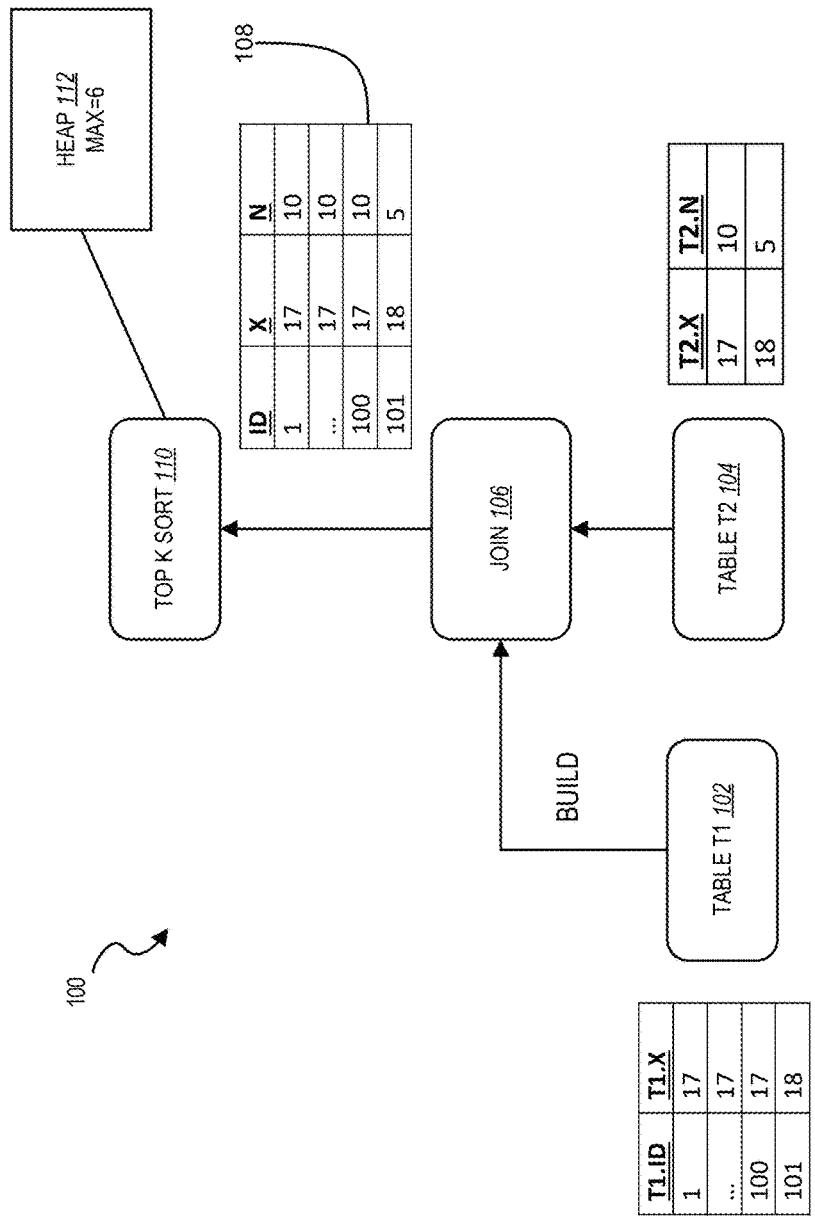
FIG. 1 depicts a query plan formed from a top K sort having an embedded join, in accordance with an example embodiment.

A technical problem, however, is encountered with implementing such an optimization when the operation is performed subsequently to a join operation. FIG. 1 is an example of a query plan 100 formed from a top K sort having an embedded join, in accordance with an example embodiment. Specifically, the query plan 100 reflects an ordering of operations to perform the database command "SELECT id, x, n, FROM T1 JOIN T2 ON T1.x=T2.c ORDER BY T2.n LIMIT K."

Here, table T1 102 is jointed with table T2 104 by a JOIN operation 106, producing join table 108. Only then are the elements from the join table 108 passed to the top K sort operation 110, which uses a heap 112 of size K to perform the sorting. The problem is the efficiency described earlier with respect to determining whether an element is greater than the value in the top (root) node of the heap 112 and cannot be pushed lower than the JOIN operation 106, meaning that elements that might otherwise not be needed to fulfill the command as a whole are still processed by the JOIN operation 106, which wastes processing cycles. This is because the system is unable to know whether further rows from table T2 that still need to be processed have a join partner without further knowledge, such as a foreign key from table T1 102.

In an example embodiment, an early filter is applied with a query plan using intra-pipeline predicate back-propagation. Specifically, the query plan, such as the query plan 100, may be thought of as a pipeline of operations. A runtime variable var may be introduced, and a specialized filter using var may be pushed down below the join operation. Var is a dynamic variable that is updated to track a value from the sort or similar operation (such as max (heap), reflecting the maximum value of a max-heap used by the sort or similar operation). The runtime variable gets initialized once the heap reaches some minimum number of elements (such as K in the case of a top K sort). Thus, before the heap reaches that minimum number of elements, the filter does not apply. Once the heap does reach that minimum number of elements, the filter does apply and acts to filter elements. Since the filter has been pushed down below the join operation, this saves processing cycles.

Figure 2:
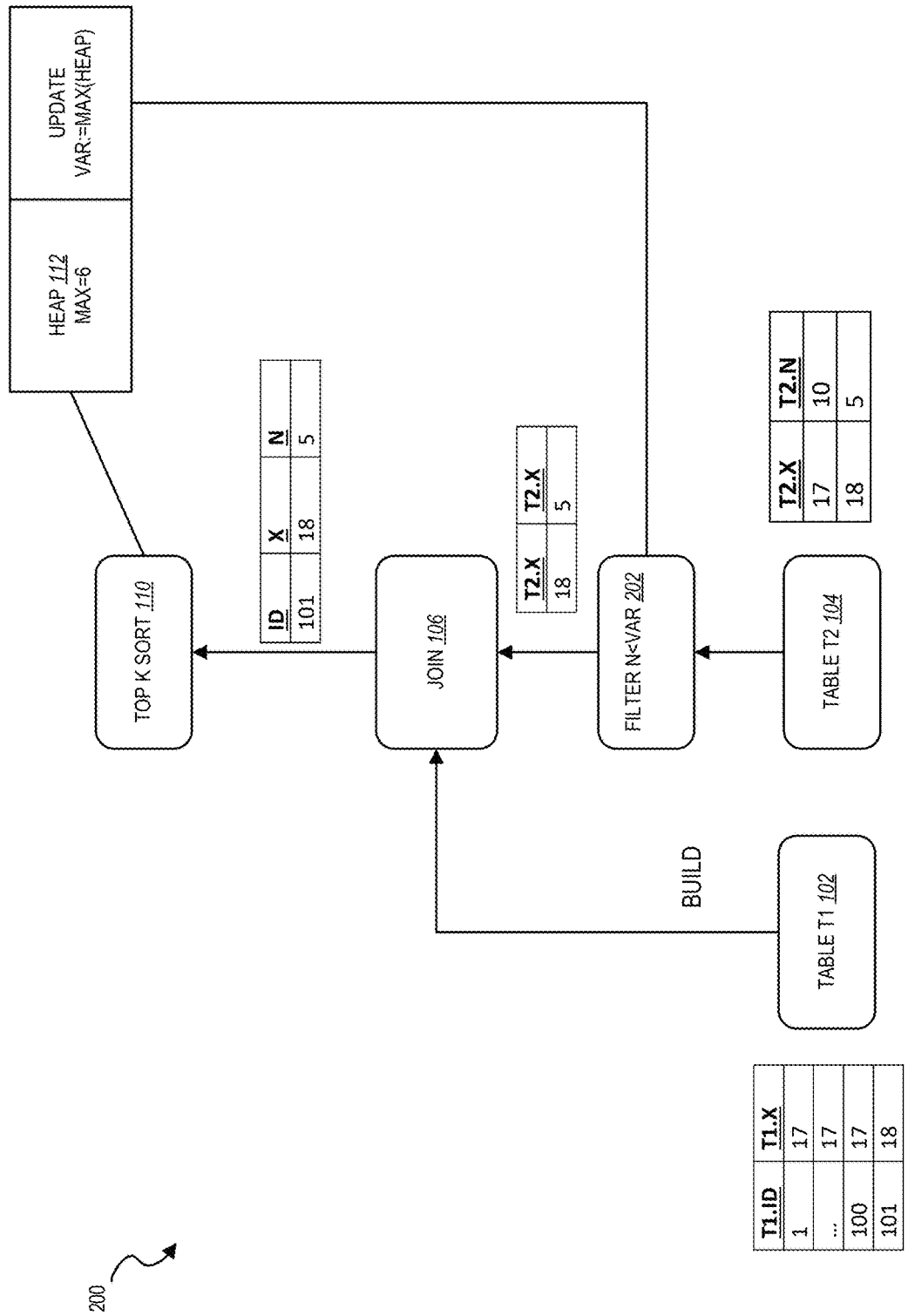
FIG. 2 depicts an optimized query plan formed from a top K sort having an embedded join, in accordance with an example embodiment.

FIG. 2 is an example of an optimized query plan 200 formed from a top K sort having an embedded join, in accordance with an example embodiment. Thus, FIG. 2 is depicting one example of use of the presently-described early filter technique. Notably, the query plan 200 reflects an ordering of operations to perform the database command "SELECT id, x, n, FROM T1 JOIN T2 ON T1.x=T2.c ORDER BY T2.n LIMIT K," which is the same database command as in FIG. 1. Here, however, a filter n<var 202 is inserted below the JOIN operation 106. This filter takes the dynamic variable var as defined on the heap used by the top K Sort operation 110, but acts to filter out appropriate elements before they are delivered to the JOIN operation 106. While the top K sort operation 110 itself cannot be pushed below the JOIN operation 106, the pruning part of it can, using the dynamic variable filter as indicated.

It should be noted that while the above examples involve top K sort operations and similar limits, the solution may be described more generally to apply to many different types of operations, and nothing in this disclosure shall be interpreted as limiting the type of operation(s) on which the solution can be applied, unless explicitly claimed. Specifically, the filter can be pushed down through multiple operators/joins to where the field is first introduced in the pipeline. This mainly pertains to column stores, where field materialization is costly and thus deferred, but this is not always the case. It should be noted, however, that it is not mandatory that the filter be pushed down to its lowest possible location in the pipeline. In some cases it may not be desirable to do so. The filter itself does incur some processing overhead, and thus based on heuristic or cost-based decisions by a query optimizer, it may be preferable to place the filter higher up on the pipeline. For example, rather than drop the filter down below the lowest possible join of multiple joins in a pipeline, it may be desirable to place it somewhere more in the middle, below at least one of the joins but above another join if it is determined, for example, that the filter placed further below would be unlikely to result in significant processing cycle savings to justify its own processing cycle cost.

Figure 3:
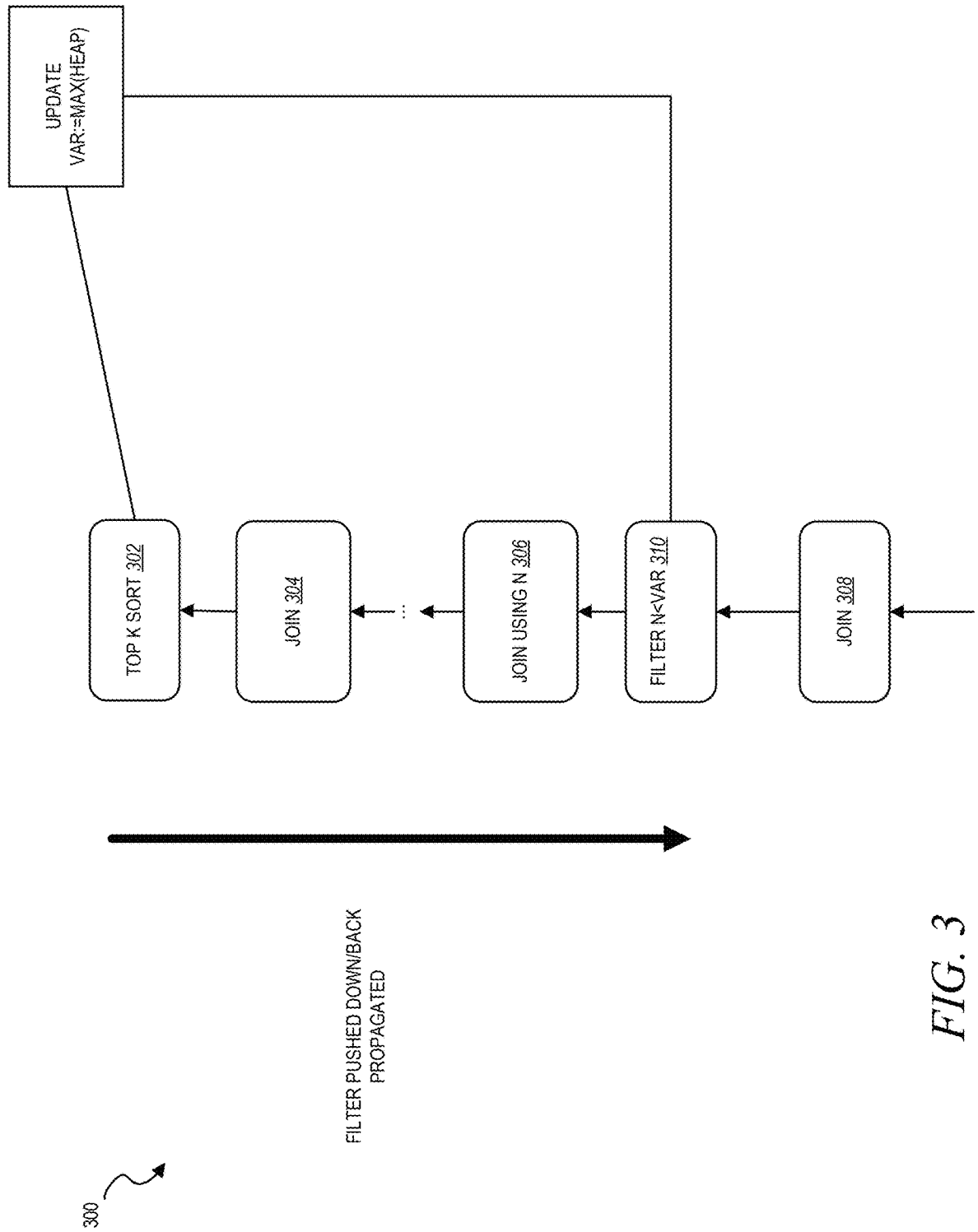
FIG. 3 depicts a generalized optimized query plan, in accordance with an example embodiment.

FIG. 3 is an example of a generalized optimized query plan 300, in accordance with an example embodiment. Here, the top K sort operation 302 is above a first join operation 304, a second join operation 306, and a third join operation 308. The second join operation 306 may be the lowest join operation in the pipeline that uses field n on which a filter 310 is applied, and thus in one example embodiment, the filter 310 is placed, as depicted in this figure, between the second join operation 306 and the third join operation 308. However, heuristics may indicate that it would be more efficient to place the filter 310 between the first join operation 304 and the second join operation 306. Either would work to optimize the top K sort operation 302, but one placement may be more desirable than the other based on the cost of the filter 310 in processing cycles and how much its placement would actually reduce the processing cycles needed for the top K sort operation 302.

Figure 4:
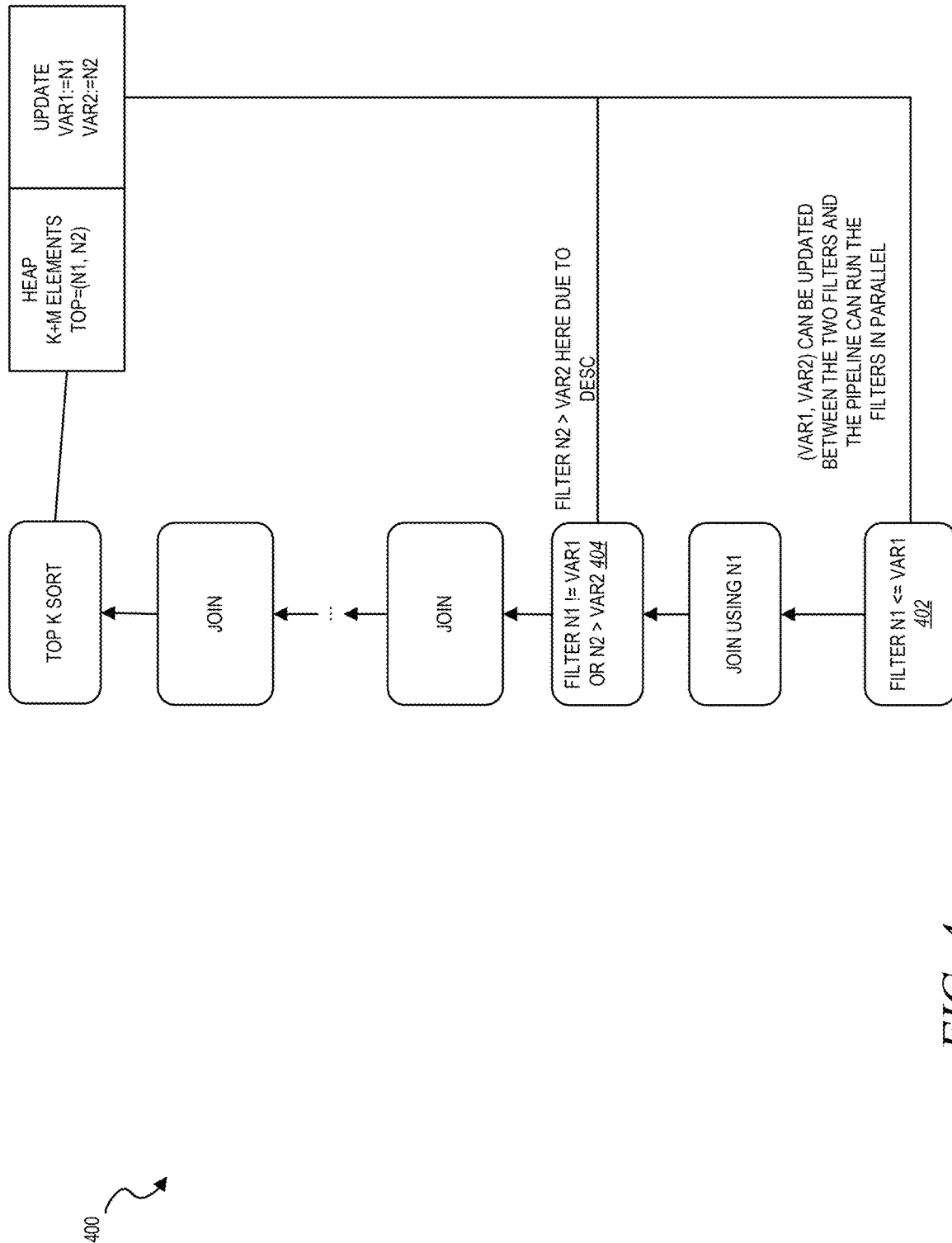
FIG. 4 depicts a generalized optimized query plan ordering on multiple attributes, in accordance with an example embodiment.

The techniques described herein can also apply to ordering operations that are performed on multiple attributes as well as operations using clauses such as offset. FIG. 4 is an example of a generalized optimized query plan 400 ordering on multiple attributes, in accordance with an example embodiment. Here, the database command is "ORDER BY n1 ASC, n2 DESC", which implies an ordering relation as follows: "$(x_1, x_2) < (y_1, y_2) \Leftrightarrow x_1 < y_1$ or $(x_1 = y_1$ and $x_2 > y_2)$." Thus on all but the last field being sorted on, the filter must let equal values pass. Additionally, there may also be an OFFET M clause.

Here, two filters may be utilized, specifically filer n1<=var1 402, and filter n1!=var1 or n2>var2 404. Here, (var1, var2) can be updated between the two filters, and it is even possible that the pipeline could be running these two filters in parallel, which provides additional optimization benefits.

Figure 5:
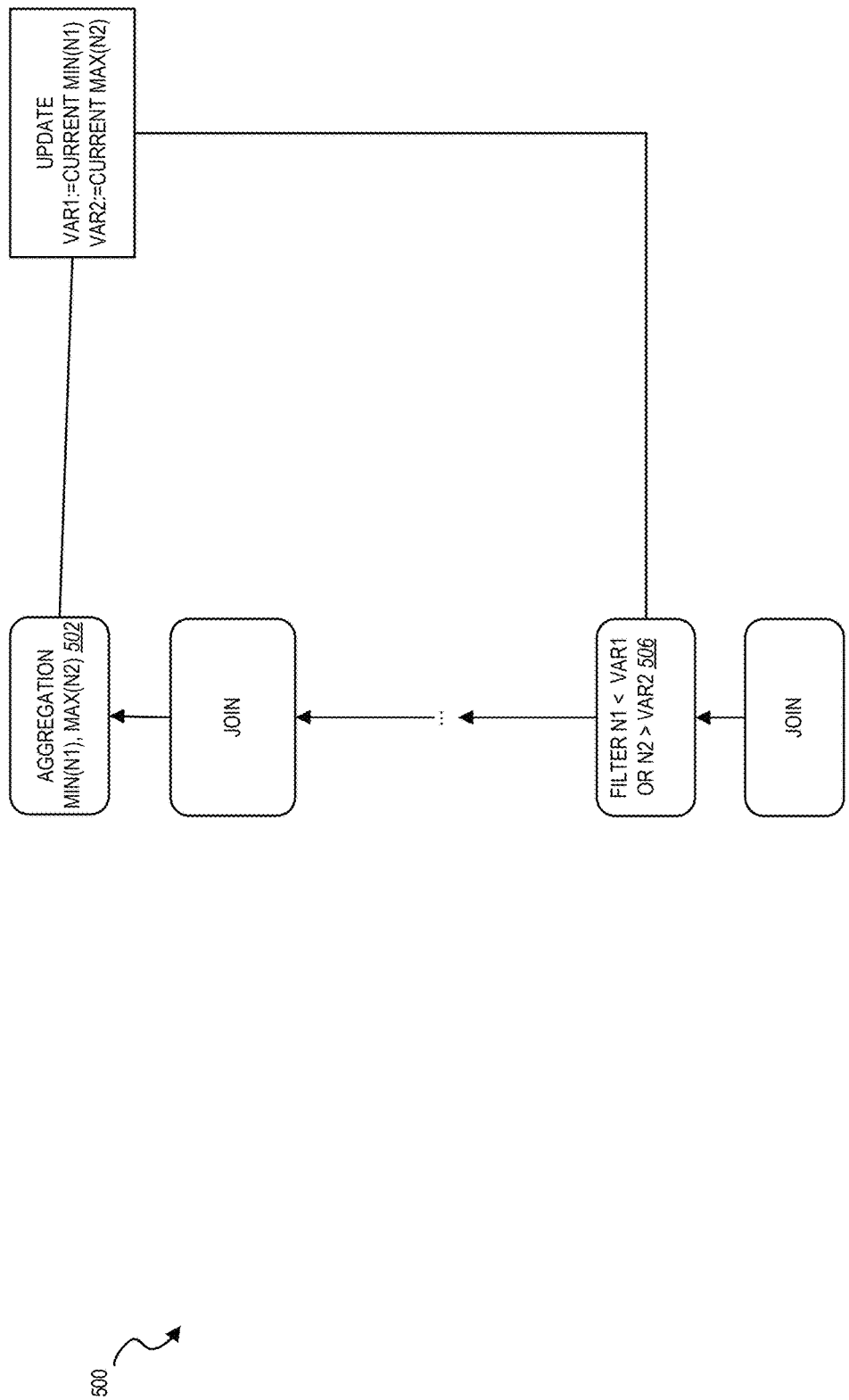
FIG. 5 depicts an optimized query plan for a min/max aggregation, in accordance with an example embodiment.

Additionally, outside of sorting operations, the technique can also be applied to other types of operations that involve having some sort of limit on elements such as min/max aggregation. FIG. 5 is an example of an optimized query plan 500 for a min/max aggregation, in accordance with an example embodiment. Here, an aggregation based on min (n1), max (n2) is performed at aggregation operation 502. Here, filter n1<var1 or n2>var2 506 may be used.

Figure 6:
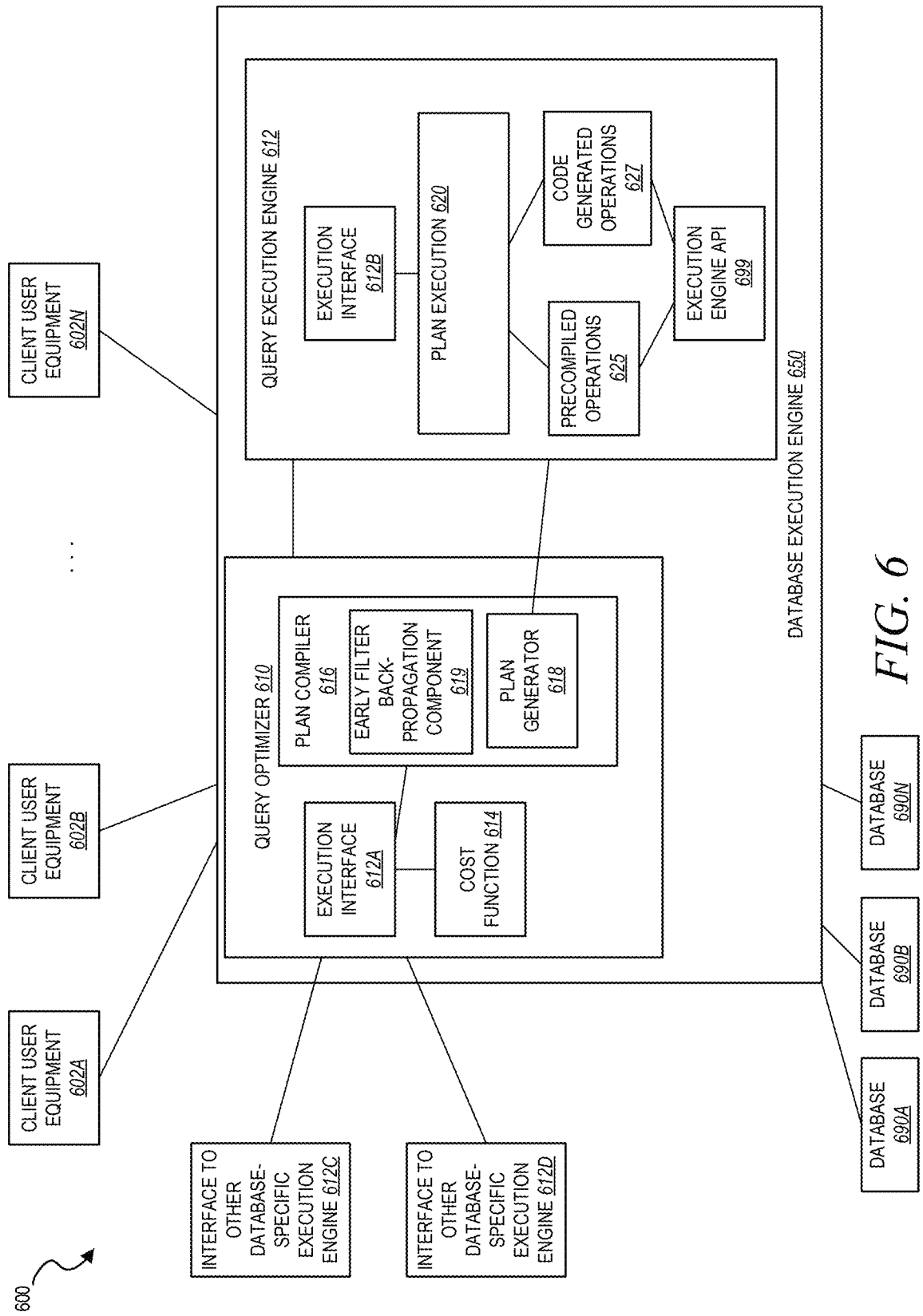
FIG. 6 is a block diagram illustrating an example of a database management system, in accordance with some example implementations.

FIG. 6 is a block diagram illustrating an example of a database management system 600, in accordance with some example implementations.

The database management system 600 may include one or more user equipment 602A, 602B, . . . , 602N, such as a computer, a smartphone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 690A, 690B, . . . , 690N, and/or to receive responses to those queries.

In the example of FIG. 6, the databases 690A, 690B, . . . , 690N represent the database layer of a database management system 600 where data may be persisted and/or stored in a structured way, and where the data can be queried or operated on using operations including SQL commands or other types of commands/instructions to provide reads, writes, and/or perform other operations. To illustrate by way of an example, user equipment 602A, 602B, . . . , 602N may send a query via a database execution engine 650 to the databases 690A, 690B, . . . , 690N, which may represent a persistence and/or storage layer where database tables may be stored and/or queried. The query may be sent via a connection, such as a wired and/or wireless connection (e.g., the Internet, cellular links, WiFi links, and/or the like).

The database execution engine 650 may include a query optimizer 610, such as a SQL optimizer and/or another type of optimizer, to receive at least one query from a user equipment and generate a query plan (which may be optimized) for execution by the query execution engine 612. The query optimizer 610 may receive a request, such as a query, and then form or propose an optimized query plan. The query plan (which may be optimized) may be represented as so-called "query algebra" or "relational algebra."

For example, a database command "SELECT id, x, n FROM T1 JOIN T2 ON T1.x=T2.x ORDER BY T2.n LIMIT K" may be received by the database execution engine 650 including the query optimizer 610. There may be several ways of implementing execution of this query. As such, the query plan may offer hints or propose an optimum query plan with respect to the execution time of the overall query. To optimize a query, the query optimizer 610 may obtain one or more costs for the different ways the execution of the query plan can be performed. The costs may be obtained via the execution interface 612A from a cost function 614, which responds to the query optimizer 610 with the cost(s)

for a given query plan (or portion thereof), and these costs may be in terms of execution time at the databases 690A, 690B, ..., 690N, for example.

The query optimizer 610 may form an optimum query plan, which may represent a query algebra, as noted above. To compile a query plan, the query optimizer 610 may provide the query plan to the query plan compiler 616 to enable compilation of some, if not all, of the query plan. The query plan compiler 616 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, plan compiler 616 may select pre-compiled code for a given operation as part of the optimization of the query plan, while for another operation in the query plan, the plan compiler 616 may allow a compiler to generate the code. The pre-compiled and generated code represents code for executing the query plan, and this code may be provided to the plan generator 618, which interfaces with the query execution engine 612.

In some implementations, the query optimizer 610 may optimize the query plan by compiling and generating code. Moreover, the query optimizer 610 may optimize the query plan to enable pipelining during execution.

In an example embodiment, the query optimizer 610 may further include an early filter back-propagation component 619. The early filter back-propagation component 619 may act to create one or more dynamic filter operations to be inserted into the query plan, based on one or more dynamic filters from another operation higher up in the pipeline. In this way, values from the operation higher up in the pipeline are passed down to the one or more filters lower in the pipeline, creating back-propagation of that information. It should be noted that FIG. 6 depicts the early filter back-propagation component 619 as being contained within the plan compiler 616, but in actuality the early filter back-propagation component 619 can be contained anywhere in the query optimizer 610.

In some implementations, the query optimizer 610 may be configured to select other execution engines. For example, the query optimizer 610 may select, via interface 612C, an execution engine configured specifically to support a row-store database or an ABAP type database, or the query optimizer 610 may select, via interface 612D, an execution engine configured specifically to support a column-store type database. In this way, the query optimizer 610 may select whether to use the universal database execution engine 650 or legacy (e.g., database-specific) execution engines (available via interfaces 612C/D, for example).

The query execution engine 612 may receive, from the plan generator 618, compiled code to enable execution of the optimized query plan, although the query execution engine 612 may also receive code or other commands directly from a higher-level application or other device, such as user equipment 602A-N.

The query execution engine 612 may then forward, via an execution interface 612B, the code to a plan execution engine 620. The plan execution engine 620 may then prepare the plan for execution, and this query plan may include pre-compiled operations 625 and/or code generated operations 627. When the code for the query plan is ready for execution during runtime, the query execution engine 612 may step through the code, performing some of the operations within the database execution engine 650 and sending some of the operations (or commands in support of an operation, such as a read, write, and/or the like) to the execution engine application programming interface (API) 699 for execution at one or more of databases 690A-N.

Figure 7:
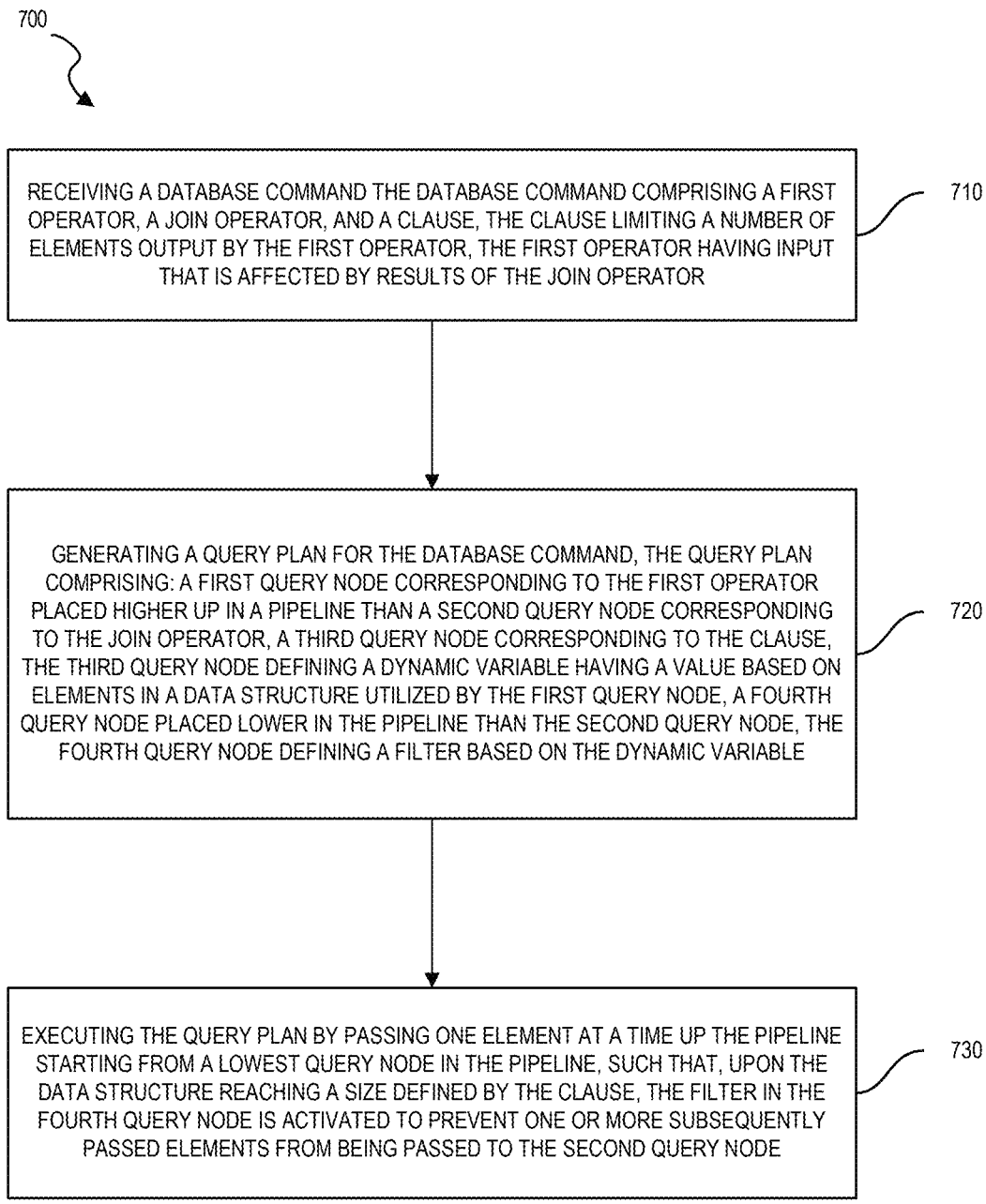
FIG. 7 is a flowchart of an example method for generating and executing an optimized query plan, in accordance with an example embodiment.

FIG. 7 is a flowchart of an example method 700 for generating and executing an optimized query plan, in accordance with an example embodiment. At operation 710, a database command is received comprising a first operator, a join operator, and a clause, the clause limiting a number of elements output by the first operator, the first operator having input that is affected by results of the join operator. At operation 720, a query plan is generated for the database command. The query plan comprises a first query node corresponding to the first operator placed higher up in a pipeline than a second query node corresponding to the join operator, a third query node corresponding to the clause, the third query node defining a dynamic variable having a value based on elements in a data structure utilized by the first query node, and a fourth query node placed lower in the pipeline than the second query node, the fourth query node defining a filter based on the dynamic variable.

At operation 730, the query plan is executed by passing one element at a time up the pipeline starting from a lowest query node in the pipeline, such that, upon the data structure reaching a size defined by the clause, the filter in the fourth query node is activated to prevent one or more subsequently passed elements from being passed to the second query node.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1 is a system comprising: at least one hardware processor; a computer-readable medium storing instructions that, when executed by the at least one hardware processor, cause the at least one hardware processor to perform operations comprising: receiving a database command, the database command comprising a first operator, a join operator, and a clause, the clause limiting a number of elements output by the first operator, the first operator having input that is affected by results of the join operator; generating a query plan for the database command, the query plan comprising: a first query node corresponding to the first operator placed higher up in a pipeline than a second query node corresponding to the join operator; a third query node corresponding to the clause, the third query node defining a dynamic variable having a value based on elements in a data structure utilized by the first query node; a fourth query node placed lower in the pipeline than the second query node, the fourth query node defining a filter based on the dynamic variable; and executing the query plan by passing one element at a time up the pipeline starting from a lowest query node in the pipeline, such that, upon the data structure reaching a size defined by the clause, the filter in the fourth query node is activated to prevent one or more subsequently passed elements from being passed to the second query node.

In Example 2, the subject matter of Example 1 comprises, wherein the first operator is a sort operator.

In Example 3, the subject matter of Examples 1-2 comprises, wherein the data structure is a max-heap.

In Example 4, the subject matter of Examples 1-3 comprises, wherein the clause comprises a limit operator.

In Example 5, the subject matter of Examples 1-4 comprises, wherein the clause comprises an offset operator.

In Example 6, the subject matter of Examples 1-5 comprises, wherein the clause comprises both a limit and an offset operator.

In Example 7, the subject matter of Examples 1-6 comprises, wherein the first operator is an aggregation operator.

In Example 8, the subject matter of Examples 1-7 comprises, wherein the clause comprises a minimum or maximum operator.

In Example 9, the subject matter of Examples 2-8 comprises, wherein the sort operator defines a sort based on two different attributes and wherein the query plan further comprises: a fifth query node defining a second filter based on a second dynamic variable of the data structure, the first dynamic variable based on a first of the two different attributes and the second dynamic variable based on a second of the two different attributes.

In Example 10, the subject matter of Example 9 comprises, wherein the fourth query node and the fifth query node are executed in parallel.

In Example 11, the subject matter of Examples 1-10 comprises, wherein the fourth query node is placed lower than a query node corresponding to a join operator that first uses a value in an attribute evaluated by the filter, but above any other operator lower in the pipeline than the query node corresponding to a join operator that first uses a value in an attribute evaluated by the filter.

Example 12 is a method comprising: receiving a database command, the database command comprising a first operator, a join operator, and a clause, the clause limiting a number of elements output by the first operator, the first operator having input that is affected by results of the join operator; generating a query plan for the database command, the query plan comprising: a first query node corresponding to the first operator placed higher up in a pipeline than a second query node corresponding to the join operator; a third query node corresponding to the clause, the third query node defining a dynamic variable having a value based on elements in a data structure utilized by the first query node; a fourth query node placed lower in the pipeline than the second query node, the fourth query node defining a filter based on the dynamic variable; and executing the query plan by passing one element at a time up the pipeline starting from a lowest query node in the pipeline, such that, upon the data structure reaching a size defined by the clause, the filter in the fourth query node is activated to prevent one or more subsequently passed elements from being passed to the second query node.

In Example 13, the subject matter of Example 12 comprises, wherein the first operator is a sort operator.

In Example 14, the subject matter of Example 13 comprises, wherein the sort operator defines a sort based on two different attributes, and wherein the query plan further comprises: a fifth query node defining a second filter based on a second dynamic variable of the data structure, the first dynamic variable based on a first of the two different attributes and the second dynamic variable based on a second of the two different attributes.

In Example 15, the subject matter of Example 14 comprises, wherein the fourth query node and the fifth query node are executed in parallel.

In Example 16, the subject matter of Examples 12-15 comprises, wherein the fourth query node is placed lower than a query node corresponding to a join operator that first uses a value in an attribute evaluated by the filter, but above any other operator lower in the pipeline than the query node corresponding to a join operator that first uses a value in an attribute evaluated by the filter.

Example 17 is a non-transitory machine-readable medium storing instructions which, when executed by one or more processors, cause the one or more processors to perform operations comprising: receiving a database command, the database command comprising a first operator, a join operator, and a clause, the clause limiting a number of elements output by the first operator, the first operator having input that is affected by results of the join operator; generating a query plan for the database command, the query plan comprising: a first query node corresponding to the first operator placed higher up in a pipeline than a second query node corresponding to the join operator; a third query node corresponding to the clause, the third query node defining a dynamic variable having a value based on elements in a data structure utilized by the first query node; a fourth query node placed lower in the pipeline than the second query node, the fourth query node defining a filter based on the dynamic variable; and executing the query plan by passing one element at a time up the pipeline starting from a lowest query node in the pipeline, such that, upon the data structure reaching a size defined by the clause, the filter in the fourth query node is activated to prevent one or more subsequently passed elements from being passed to the second query node.

In Example 18, the subject matter of Example 17 comprises, wherein the first operator is a sort operator.

In Example 19, the subject matter of Example 18 comprises, wherein the sort operator defines a sort based on two different attributes and wherein the query plan further comprises: a fifth query node defining a second filter based on a second dynamic variable of the data structure, the first dynamic variable based on a first of the two different attributes, and the second dynamic variable based on a second of the two different attributes.

In Example 20, the subject matter of Example 19 comprises, wherein the fourth query node and the fifth query node are executed in parallel.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 8:
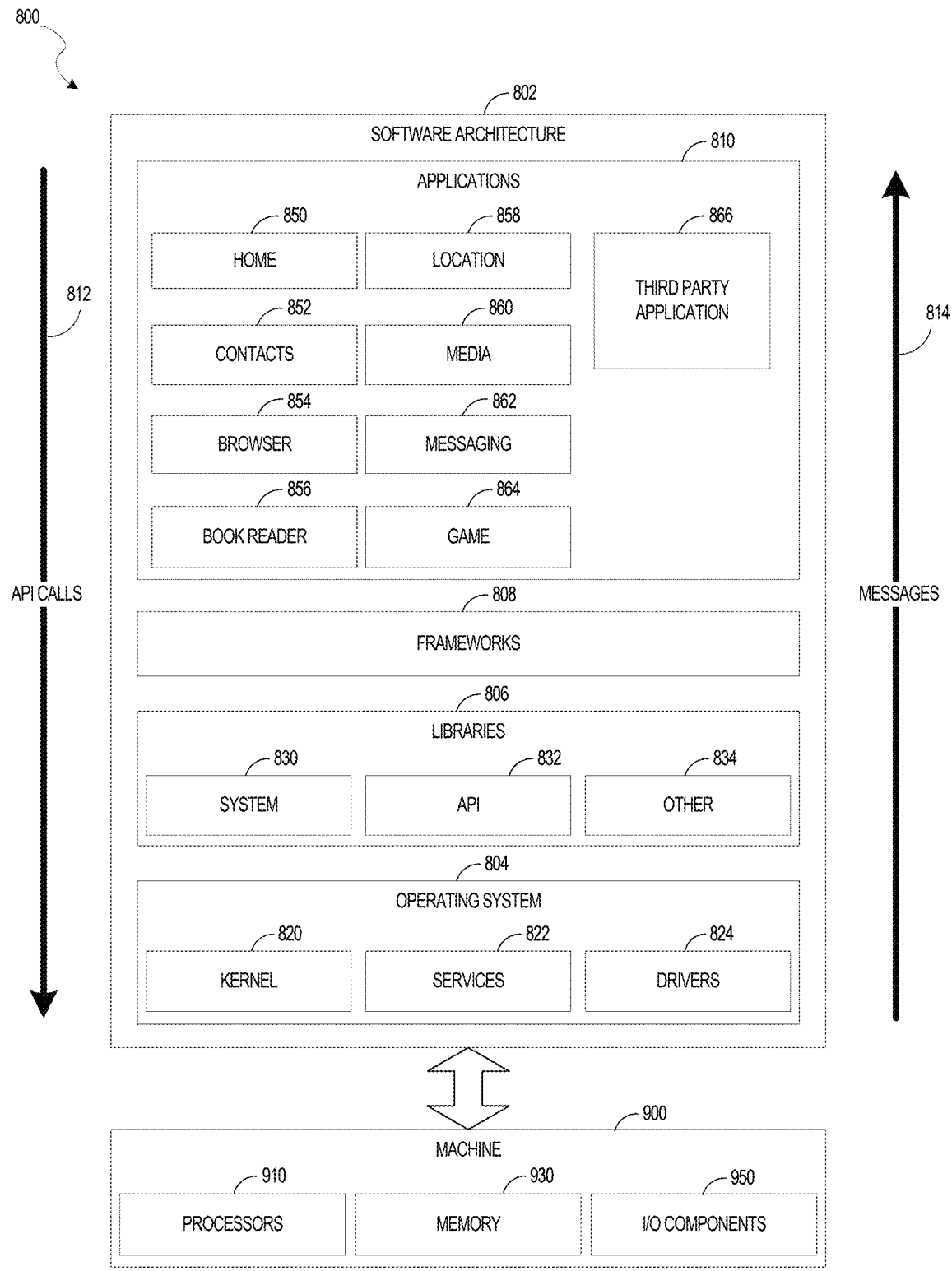
FIG. 8 is a block diagram illustrating a software architecture, in accordance with an example embodiment.

FIG. 8 is a block diagram 800 illustrating a software architecture 802, which can be installed on any one or more of the devices described above. FIG. 8 is merely a non-limiting example of a software architecture, and it will be appreciated that many other architectures can be implemented to facilitate the functionality described herein. In various embodiments, the software architecture 802 is implemented by hardware such as a machine 900 of FIG. 9 that comprises processors 910, memory 930, and input/output (I/O) components 950. In this example architecture, the software architecture 802 can be conceptualized as a stack of layers where each layer may provide a particular functionality. For example, the software architecture 802 comprises layers such as an operating system 804, libraries 806, frameworks 808, and applications 810. Operationally, the applications 810 invoke API calls 812 through the software stack and receive messages 814 in response to the API calls 812, consistent with some embodiments.

In various implementations, the operating system 804 manages hardware resources and provides common services. The operating system 804 comprises, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware. For instance, the drivers 824 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (PEG or JPG), or Portable Network Graphics (PNG), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810. For example, the frameworks 808 provide various graphical user interface functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. The applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit [SDK] by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 9:
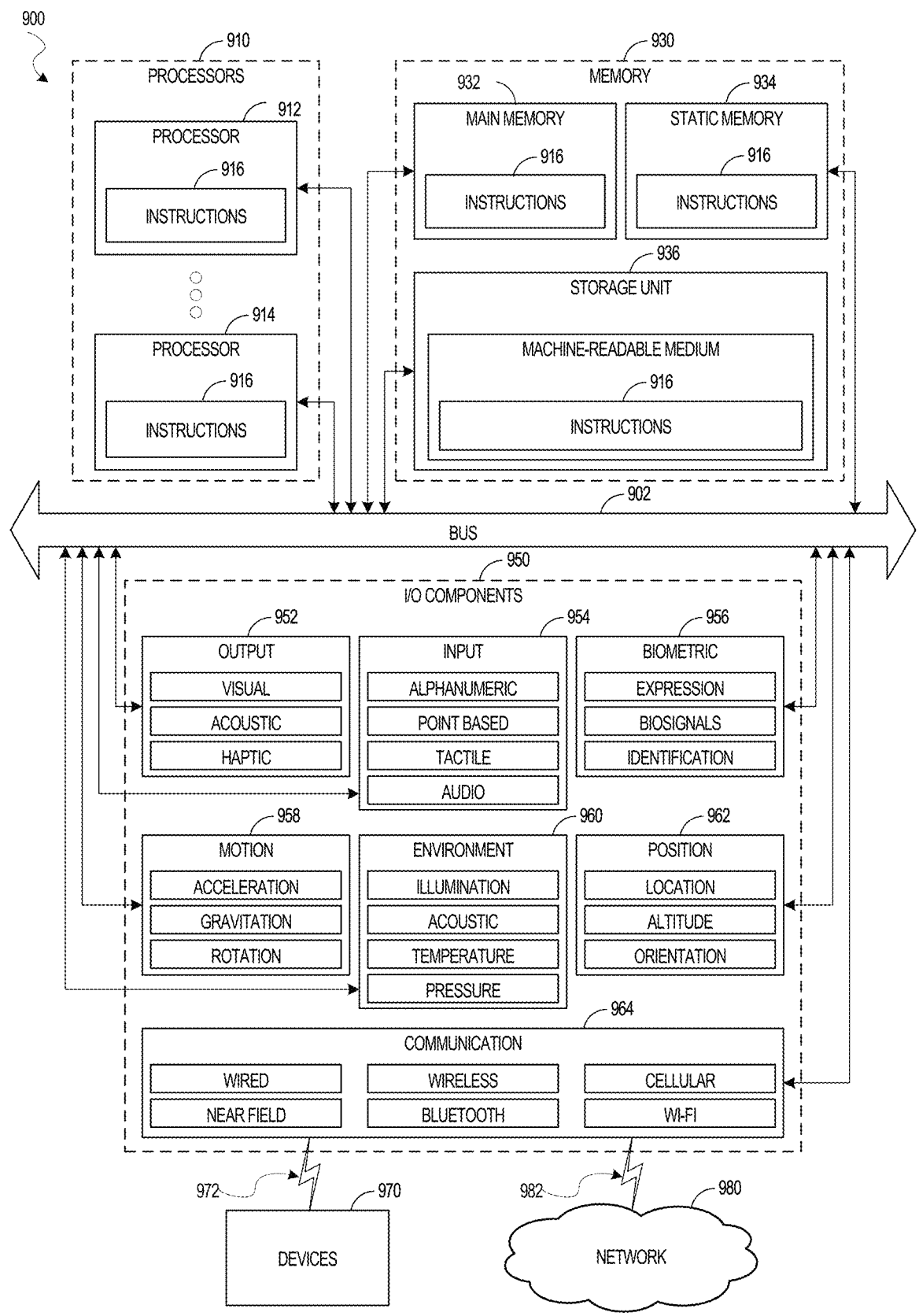
FIG. 9 illustrates a diagrammatic representation of a machine in the form of a computer system within which a set of instructions may be executed for causing the machine to perform any one or more of the methodologies discussed herein.

FIG. 9 illustrates a diagrammatic representation of a machine 900 in the form of a computer system within which a set of instructions may be executed for causing the machine 900 to perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the method 700 of FIG. 7. Additionally, or alternatively, the instructions 916 may implement FIGS. 1-7 and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer [or distributed] network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device [e.g., a smart watch], a smart home device [e.g., a smart appliance], other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a central processing unit [CPU], a reduced instruction set computing [RISC] processor, a complex instruction set computing [CISC] processor, a graphics processing unit [GPU], a digital signal processor [DSP], an application-specific integrated circuit [ASIC], a radio-frequency integrated circuit [RFIC], another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions 916 contemporaneously. Although FIG. 9 shows multiple processors 910, the machine 900 may include a single processor 912 with a single core, a single processor 912 with multiple cores (e.g., a multi-core processor 912), multiple processors 912, 914 with a single core, multiple processors 912, 914 with multiple cores, or any combination thereof.

The memory 930 may include a main memory 932, a static memory 934, and a storage unit 936, each accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel [PDP], a light-emitting diode [LED] display, a liquid crystal display [LCD], a projector, or a cathode ray tube [CRT], acoustic components [e.g., speakers]), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Positioning System [GPS] receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., coupled via a USB).

Moreover, the communication components 964 may detect identifiers or include components operable to detect identifiers. For example, the communication components 964 may include radio-frequency identification (RFID) tag reader components, NFC smart tag detection components, optical reader components (e.g., an optical sensor to detect one-dimensional bar codes such as Universal Product Code [UPC] bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

The various memories (i.e., 930, 932, 934, and/or memory of the processor(s) 910) and/or the storage unit 936 may store one or more sets of instructions 916 and data structures (e.g., software) embodied or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media,"

"computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980, may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., Hypertext Transfer Protocol [HTTP]). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor;
   a non-transitory computer-readable medium storing instructions that, when executed by the at least one hardware processor, cause the at least one hardware processor to perform operations comprising:
   receiving a database command, the database command comprising a first operator, a join operator, and a clause, the clause limiting a number of elements output by the first operator, the first operator having input that is affected by results of the join operator;
   generating a query plan for the database command, the query plan comprising:
   a first query node corresponding to the first operator placed higher up in a pipeline than a second query node corresponding to the join operator;
   a third query node corresponding to the clause, the third query node defining a dynamic variable having a value based on elements in a data structure utilized by the first query node;
   a fourth query node placed lower in the pipeline than the second query node, the fourth query node defining a filter based on the dynamic variable; and
   executing the query plan by passing one element at a time up the pipeline starting from a lowest query node in the pipeline, such that, upon the data structure reaching a size defined by the clause, the filter in the fourth query node is activated to prevent one or more subsequently passed elements from being passed to the second query node.

2. The system of claim 1, wherein the first operator is a sort operator.

3. The system of claim 1, wherein the data structure is a max-heap.

4. The system of claim 1, wherein the clause comprises a limit operator.

5. The system of claim 1, wherein the clause comprises an offset operator.

6. The system of claim 1, wherein the clause comprises both a limit and an offset operator.

7. The system of claim 1, wherein the first operator is an aggregation operator.

8. The system of claim 1, wherein the clause comprises a minimum or maximum operator.

9. The system of claim 2, wherein:
   the sort operator defines a sort based on two different attributes;
   the dynamic variable is a first dynamic variable based on a first of the two different attributes; and
   the query plan further comprises:
   a fifth query node defining a second filter based on a second dynamic variable of the data structure, the second dynamic variable based on a second of the two different attributes.

10. The system of claim 9, wherein the fourth query node and the fifth query node are executed in parallel.

11. The system of claim 1, wherein the fourth query node is placed lower than a query node corresponding to a join operator that first uses a value in an attribute evaluated by the filter, but above any other operator lower in the pipeline than the query node corresponding to the join operator that first uses the value in the attribute evaluated by the filter.

12. A method comprising:
   receiving a database command, the database command comprising a first operator, a join operator, and a clause, the clause limiting a number of elements output by the first operator, the first operator having input that is affected by results of the join operator;
   generating a query plan for the database command, the query plan comprising:

a first query node corresponding to the first operator placed higher up in a pipeline than a second query node corresponding to the join operator;

a third query node corresponding to the clause, the third query node defining a dynamic variable having a value based on elements in a data structure utilized by the first query node;

a fourth query node placed lower in the pipeline than the second query node, the fourth query node defining a filter based on the dynamic variable; and executing the query plan by passing one element at a time up the pipeline starting from a lowest query node in the pipeline, such that, upon the data structure reaching a size defined by the clause, the filter in the fourth query node is activated to prevent one or more subsequently passed elements from being passed to the second query node.

13. The method of claim 12, wherein the first operator is a sort operator.

14. The method of claim 13, wherein:
the sort operator defines a sort based on two different attributes;
the dynamic variable is a first dynamic variable based on a first of the two different attributes; and
the query plan further comprises:
a fifth query node defining a second filter based on a second dynamic variable of the data structure, the second dynamic variable based on a second of the two different attributes.

15. The method of claim 14, wherein the fourth query node and the fifth query node are executed in parallel.

16. The method of claim 12, wherein the fourth query node is placed lower than a query node corresponding to a join operator that first uses a value in an attribute evaluated by the filter, but above any other operator lower in the pipeline than the query node corresponding to the join operator that first uses the value in the attribute evaluated by the filter.

17. A non-transitory machine-readable medium storing instructions which, when executed by one or more processors, cause the one or more processors to perform operations comprising:

receiving a database command, the database command comprising a first operator, a join operator, and a clause, the clause limiting a number of elements output by the first operator, the first operator having input that is affected by results of the join operator;

generating a query plan for the database command, the query plan comprising:
a first query node corresponding to the first operator placed higher up in a pipeline than a second query node corresponding to the join operator;
a third query node corresponding to the clause, the third query node defining a dynamic variable having a value based on elements in a data structure utilized by the first query node;
a fourth query node placed lower in the pipeline than the second query node, the fourth query node defining a filter based on the dynamic variable; and
executing the query plan by passing one element at a time up the pipeline starting from a lowest query node in the pipeline, such that, upon the data structure reaching a size defined by the clause, the filter in the fourth query node is activated to prevent one or more subsequently passed elements from being passed to the second query node.

18. The non-transitory machine-readable medium of claim 17, wherein the first operator is a sort operator.

19. The non-transitory machine-readable medium of claim 18, wherein:
the sort operator defines a sort based on two different attributes;
the dynamic variable is a first dynamic variable based on a first of the two different attributes; and
the query plan further comprises:
a fifth query node defining a second filter based on a second dynamic variable of the data structure, the second dynamic variable based on a second of the two different attributes.

20. The non-transitory machine-readable medium of claim 19, wherein the fourth query node and the fifth query node are executed in parallel.

* * * * *